United States Patent [19]

Csipkes et al.

[11] Patent Number: 5,809,162
[45] Date of Patent: Sep. 15, 1998

[54] SURFACE ANALYSIS SYSTEM AND METHOD

[75] Inventors: Andrei Csipkes, Lawrenceville; Muid Ur-Rehman Mufti, Atlanta; John Mark Palmquist, Lilburn, all of Ga.

[73] Assignee: Lucent Technologies Inc., Murray Hill, N.J.

[21] Appl. No.: 577,947

[22] Filed: Dec. 22, 1995

[51] Int. Cl.⁶ .................................................. G06K 9/00
[52] U.S. Cl. ........................... 382/108; 382/152; 348/125
[58] Field of Search ..................... 65/376–8; 250/559.01, 250/559.04–559.06, 559.08, 559.4, 559.42, 559.44–559.48; 348/125–134; 356/73.1, 239, 240; 382/141–150, 152, 173, 180, 254, 260, 266, 276, 307, 308, 108

[56] References Cited

U.S. PATENT DOCUMENTS

| | | | |
|---|---|---|---|
| 4,738,507 | 4/1988 | Palmquist | 350/96.21 |
| 4,738,508 | 4/1988 | Palmquist | 350/96.21 |
| 4,787,698 | 11/1988 | Lyons et al. | 350/96.2 |
| 5,179,419 | 1/1993 | Palmquist et al. | 356/73.1 |
| 5,265,787 | 11/1993 | Ishizaka et al. | 228/9 |
| 5,682,440 | 10/1997 | Yukawa | 382/205 |

OTHER PUBLICATIONS

"CHECKMATE F5 SYSTEM Instruction Manual," Oyokoden Lab Co., Ltd. (at least as early as 1991).
"Norland Fiber Interferometer," Norland Products Inc., New Brunswick, NJ (1992).
"ZX–1 ZOOM INTERFEROMETERS," Direct Optical Research Company, Phoenix, AZ (at least as early as Jan. 1995).
"TOPO–3D Quick Tour Manual," Wyko Corporation, Tucson, AZ., Ltd. (Feb. 1990).
Norland, Eric A., "Defining and Measuring Physical Parameters of PC Polished Connectors," The 10th Annual National Fiber Optic Engineers Conference, San Diego, CA, Jun. 12–16, 1994, pp. 259–265.
Harding, Kevin et al., "Light Engineering for Machine Vision: Techniques and Applications," Part 1 and Part 2, Mar. 2–3, 1994, Ann Arbor, Michigan, Manufacturing Engineering Certification Institute sponsored by SME.

*Primary Examiner*—Joseph Mancuso
*Assistant Examiner*—Marc Bobys

[57] ABSTRACT

A surface analysis system can contactlessly, automatically, and rapidly detect, classify, and evaluate a surface of an object, particularly, an optical fiber end face, for discontinuities to derive a single pass/fail conclusion regarding the surface. The surface analysis system has a scope for capturing an image of the end face. A computer is connected to the scope. A machine vision system is associated with the computer for receiving the image. A surface analysis program is associated with the computer for driving the machine vision system. The program searches for any discontinuities in the image by analyzing each pixel and a corresponding pixel structure of pixels to determine whether a discontinuity resides at each pixel. Discontinuities are classified as one of the following: binary thresholds, local gradients, and directional gradients. The pixel structure includes a plurality of pixels that were previously analyzed. The program determines whether the surface is continuous based upon any discovered discontinuities.

4 Claims, 13 Drawing Sheets

| | | SE2 | | | SE1 | |
| | | | SME2 | SME1 | |
| | | | SME3 | SWE | |
| | SE4 | SME4 | | | |

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | p1 1 | p5 1 | p9 12 | p13 1 | 1 | 1 |
| 1 | 1 | p2 1 | p6 12 | p10 1 | p14 1 | 1 | 1 |
| 1 | 1 | p3 10 | p7 1 | p11 1 | p15 1 | 1 | 1 |
| 1 | 3 | p4 1 | p8 1 | p12 1 | p16 10 | 7 | 1 |
| 1 | 1 | 1 | 1 | 1 | 12 | 9 | 1 |
| 1 | 1 | 1 | 1 | 1 | 1 | 1 | 1 |

|     | LOW   | SWE | HIGH  | RESULT  |
|-----|-------|-----|-------|---------|
| eq 1 | -2    | 1   | 4     | NO GRAD |
|     | SME-2 |     | SME+2 |         |
| eq 2 |       |     |       | NA      |
| eq 3 |       |     |       | NA      |
| eq 4 |       |     |       | NA      |
| eq 5 |       |     |       | NA      |

— 72a p2

|     | LOW   | SWE | HIGH  | RESULT  |
|-----|-------|-----|-------|---------|
| eq 1 | -2    | 1   | 4     | NO GRAD |
|     | SME-2 |     | SME+2 |         |
| eq 2 |       |     |       | NA      |
| eq 3 |       |     |       | NA      |
| eq 4 |       |     |       | NA      |
| eq 5 |       |     |       | NA      |

— 72b p3

|     | LOW   | SWE | HIGH  | RESULT     |
|-----|-------|-----|-------|------------|
| eq 1 | -2    | 10  | 4     | LOCAL GRAD |
|     | SME-2 |     | SME+2 |            |
| eq 2 | -1    | 10  | 3     | FALSE      |
| eq 3 | -1    | 10  | 3     | FALSE      |
| eq 4 | -1    | 10  | 3     | FALSE      |
| eq 5 | -1    | 10  | 5     | FALSE      |

— 72c p4

|     | LOW   | SWE | HIGH  | RESULT  |
|-----|-------|-----|-------|---------|
| eq 1 | 8     | 1   | 12    | NO GRAD |
|     | SME-2 |     | SME+2 |         |
| eq 2 |       |     |       | NA      |
| eq 3 |       |     |       | NA      |
| eq 4 |       |     |       | NA      |
| eq 5 |       |     |       | NA      |

|  | LOW | SWE | HIGH | RESULT |
|---|---|---|---|---|
| eq 1 | -2<br>SME-2 | 1 | 4<br>SME+2 | NO GRAD |
| eq 2 |  |  |  | NA |
| eq 3 |  |  |  | NA |
| eq 4 |  |  |  | NA |
| eq 5 |  |  |  | NA |

— 72e p6

|  | LOW | SWE | HIGH | RESULT |
|---|---|---|---|---|
| eq 1 | -2<br>SME-2 | 12 | 4<br>SME+2 | LOCAL GRAD |
| eq 2 | -1 | 12 | 3 | FALSE |
| eq 3 | -1 | 12 | 3 | FALSE |
| eq 4 | -1 | 12 | 3 | FALSE |
| eq 5 | -8 | 12 | 12 | TRUE |

— 72f p7

|  | LOW | SWE | HIGH | RESULT |
|---|---|---|---|---|
| eq 1 | -1.33<br>SME-2 | 1 | 4.67<br>SME+2 | NO GRAD |
| eq 2 |  |  |  | NA |
| eq 3 |  |  |  | NA |
| eq 4 |  |  |  | NA |
| eq 5 |  |  |  | NA |

— 72g p8

|  | LOW | SWE | HIGH | RESULT |
|---|---|---|---|---|
| eq 1 | 1.67<br>SME-2 | 1 | 7.67<br>SME+2 | LOCAL GRAD |
| eq 2 | -1 | 1 | 3 | TRUE |
| eq 3 | -8 | 1 | 12 | FALSE |
| eq 4 | -1 | 1 | 3 | TRUE |
| eq 5 | -1 | 1 | 3 | TRUE |

|      | LOW   | SWE | HIGH  | RESULT     |
|------|-------|-----|-------|------------|
| eq 1 | -2    | 12  | 4     | LOCAL GRAD |
|      | SME-2 |     | SME+2 |            |
| eq 2 | -1    | 12  | 3     | FALSE      |
| eq 3 | -1    | 12  | 3     | FALSE      |
| eq 4 | -1    | 12  | 3     | FALSE      |
| eq 5 | 10    | 12  | 14    | TRUE       | p10

|      | LOW   | SWE | HIGH  | RESULT  |
|------|-------|-----|-------|---------|
| eq 1 | 1     | 1   | 7     | NO GRAD |
|      | SME-2 |     | SME+2 |         |
| eq 2 |       |     |       | NA      |
| eq 3 |       |     |       | NA      |
| eq 4 |       |     |       | NA      |
| eq 5 |       |     |       | NA      | p11

|      | LOW   | SWE | HIGH  | RESULT     |
|------|-------|-----|-------|------------|
| eq 1 | 1.67  | 1   | 4     | LOCAL GRAD |
|      | SME-2 |     | SME+2 |            |
| eq 2 | -1    | 1   | 3     | TRUE       |
| eq 3 | 10    | 1   | 14    | FALSE      |
| eq 4 | -1    | 1   | 3     | TRUE       |
| eq 5 | -1    | 1   | 3     | TRUE       | p12

|      | LOW   | SWE | HIGH  | RESULT  |
|------|-------|-----|-------|---------|
| eq 1 | 1     | 1   | 7     | NO GRAD |
|      | SME-2 |     | SME+2 |         |
| eq 2 |       |     |       | NA      |
| eq 3 |       |     |       | NA      |
| eq 4 |       |     |       | NA      |
| eq 5 |       |     |       | NA      |

FIG. 7E p13

|     | LOW           | SWE | HIGH          | RESULT     |
|-----|---------------|-----|---------------|------------|
| eq 1 | 1.67<br>SME-2 | 1   | 7.67<br>SME+2 | LOCAL GRAD |
| eq 2 | -1            | 1   | 3             | TRUE       |
| eq 3 | -1            | 1   | 3             | TRUE       |
| eq 4 | 10            | 1   | 14            | FALSE      |
| eq 5 | -1            | 1   | 3             | TRUE       |

~72m p14

|     | LOW           | SWE | HIGH        | RESULT  |
|-----|---------------|-----|-------------|---------|
| eq 1 | -2<br>SME-2  | 1   | 4<br>SME+2  | NO GRAD |
| eq 2 |               |     |             | NA      |
| eq 3 |               |     |             | NA      |
| eq 4 |               |     |             | NA      |
| eq 5 |               |     |             | NA      |

~72n p15

|     | LOW           | SWE | HIGH          | RESULT     |
|-----|---------------|-----|---------------|------------|
| eq 1 | 1.67<br>SME-2 | 1   | 7.67<br>SME+2 | LOCAL GRAD |
| eq 2 | -1            | 1   | 3             | TRUE       |
| eq 3 | -1            | 1   | 3             | TRUE       |
| eq 4 | -1            | 1   | 3             | TRUE       |
| eq 5 | -1            | 1   | 3             | TRUE       |

~72o p16

|     | LOW          | SWE | HIGH        | RESULT     |
|-----|--------------|-----|-------------|------------|
| eq 1 | -2<br>SME-2 | 10  | 4<br>SME+2 | LOCAL GRAD |
| eq 2 | -1           | 10  | 3           | FALSE      |
| eq 3 | -1           | 10  | 3           | FALSE      |
| eq 4 | -1           | 10  | 3           | FALSE      |
| eq 5 | -1           | 10  | 3           | FALSE      |

~72p

SURFACE ANALYSIS SYSTEM AND METHOD

FIELD OF THE INVENTION

The present invention generally relates to measurement, testing, and quality control systems, and more particularly, to a surface analysis system and method for automatically, contactlessly, and rapidly detecting, classifying, and evaluating discontinuities, or defects, in the surface of an object. Although not limited to this particular application, the surface analysis system and method are particularly suited for analyzing an optical fiber end face and determining the adequacy of the end face for a connector.

BACKGROUND OF THE INVENTION

An optical fiber cable used for communications includes an optical fiber. The optical fiber has a core that is designed to communicate most of the light that is sent through the cable and cladding that surrounds and protects the core. The cladding is in turn covered with one or more coating, insulating, shielding, and/or support layers to complete the cable. Considering that a typical optical fiber core may measure only about 8 to 50 microns (micrometers) in diameter, the connection of two optical fiber cables so that their cores are precisely aligned is a formidable task.

In order to establish such a precise connection between optical fibers, several different connection configurations have been developed in the art. A common connection configuration utilizes ferrule connectors, which were originally developed by AT&T, U.S.A. An example of a ferrule connector is shown and described in U.S. Pat. No. 4,738,508 to Palmquist and U.S. Pat. No. 4,738,507 to Palmquist. Industry names for identifying some commercially available and well known ferrule connectors include, as examples, the domed ST, SC, FC, and D4 connectors, which have a domed fiber end face, and the flat SC and ST connectors, which have a flat fiber end face.

In a ferrule connector, the end of the optical fiber cable to be joined is terminated with a domed or flat end face, and the termination is provided with a surrounding support structure called a plug, or ferrule. The plug enables mating engagement of the connector to a ferrule coupling structure. To enable optimal optical performance and minimize light energy losses and reflections, the end faces of the separate optical fiber connectors should be coupled by the coupling structure so that the cores of the respective end faces are precisely aligned and contiguous.

Furthermore, the end faces of the two fiber terminations in a ferrule connection need to have smooth surfaces. More specifically, in the case of optical fiber connectors having domed end faces, for example, the domed ST, SC, FC, and D4 connectors, the end faces should be uniformly domed, and in the case of optical fiber connectors having flat end faces, for example, the flat SC and ST connectors, the end faces should be continuously flat. The reason is that discontinuities, such as scratches, cracks, chips, or pits, in the end face scatter light and cause reflections. To eliminate these discontinuities, the fiber end faces are usually polished or otherwise processed to smooth the surfaces during manufacture of the connectors.

It is important that each fiber end face be inspected after polishing for quality control reasons to insure that the end face has a continuous surface and is adequate to serve as a light propagation junction in the connector. Traditionally, fiber end faces were manually inspected by humans by viewing the end faces under a microscope. Such a manual inspection is not reliable, as it depends on the visual acuity of a human being as well as on the quality of the microscope that is used for inspection. Further, such inspection is very subjective. A production worker can apply a prescribed set of rules, but it is very difficult to objectively quantify the number and nature of discontinuities in a fiber end face. Finally, very fine or small discontinuities can occur which are difficult for human inspectors to detect, even with the best optical aids. In fact, the lack of consistent quantitative measures for detecting discontinuities has been a major obstacle to the development of quality standards for optical fiber connectors.

U.S. Pat. No. 5,179,419 to Palmquist et al. and assigned to AT&T, U.S.A., describes a system and method for contactlessly analyzing discontinuities in optical fiber end faces. The system utilizes a computer interconnected with a machine vision system and a microscope. The microscope provides images of an optical fiber end face to the computer and machine vision system. At the time, the foregoing system was considered a significant advancement in the art. However, it does have some limitations, as set forth hereafter.

First, the AT&T system required the acquisition of three separate images acquired at three distinct focus positions. These three images were processed to form a multiplicity of intermediate images which were used to extract features such as scratches, chips, and cracks. The algorithms and optical focusing system were optimized for the flat ST connector with protruding fiber. This connector type has since been replaced by a domed polish end which is capable of being inspected with a much simpler algorithm.

Second, the AT&T system did not include an algorithm that provided an overall grade of the connector. Interpretation of the end face quality was the responsibility of a human operator who was required to interpret a final processed image or manually scroll through a list of features such as straight scratches, curved scratches, straight cracks, curved cracks, and so-called "blobs" and assess the seriousness of each detected feature.

Third, the AT&T system did not have the capability to assess the surface roughness in cases where the end face of the fiber was devoid of scratches, cracks, pits, etc.

Fourth, the AT&T system's computational intensity was such that the amount of time required to inspect a fiber varied substantially with the number of surface features detected. A "perfect" connector could be processed in as little as 30 seconds, while a connector having a substantial amount of surface features, such as scratches, took as long as 60 seconds to process, owing to the complexity of the line matching algorithm for labeling edges. This time requirement seriously limits application in automated assembly systems.

Fifth, the AT&T system could not process certain images at all, because the capacity to label and process features was limited by constraints in the memory and computational capacity of the computer.

What is needed, and what is not provided in the prior art, is an automated inspection system and method having at least the following features: a capability to assign an overall damage index to the surface that can be used to predict optimal performance such as insertion loss and return loss; a capability to assess the overall surface roughness apart from detecting and labeling scratches, cracks, and pits; a capability of processing each image in a fixed, predictable amount of time that is preferably in seconds to enable continuous material flow when the inspection system is used as part of an a automated assembly process with separate stations for assembly, polishing and final inspection; and a capability of processing any image, regardless of the number of features present.

SUMMARY OF THE INVENTION

An object of the invention is to overcome the deficiencies and inadequacies of the prior art as described previously.

Another object of the present invention is to provide a surface analysis system and method for automatically and contactlessly detecting and classifying discontinuities in a surface of an object, for example but not limited to, an optical fiber end face.

Another object of the present invention is to provide a surface analysis system and method that implements a single pass through an image of the end face in order to detect scratches and localized pitting.

Another object of the present invention is to provide a surface analysis system and method that can detect and classify discontinuities in an optical fiber end face in much less time than any existing imaging systems.

Another object of the present invention is to provide an analysis system and method for automatically decisively concluding whether an optical fiber end face is adequate or inadequate based upon discontinuities, i.e., a single definitive pass/fail conclusion.

Another object of the present invention is to provide an intelligent methodology for assimilating discontinuity data regarding an optical fiber end face in order to make decisions regarding whether or not the optical fiber end face is deficient and should be rejected.

Briefly described, the present invention is a surface analysis system and method for automatically and contactlessly detecting and classifying discontinuities in a surface of an object, particularly, an optical fiber end face. The surface analysis system has a scope for capturing an image of the end face. A computer is connected to the scope. A machine vision system is associated with the computer for receiving the image. A surface analysis program is associated with the computer for driving the machine vision system. The program searches for any discontinuities in the image by analyzing the pixels. Discontinuities are classified as one of the following: (a) binary thresholds, resulting from, e.g., large indentations and depressions, (b) local gradients, resulting from, e.g., small localized pits, indentations, and depressions, and (c) directional gradients, resulting from, e.g., scratches. Because of the foregoing classification system, the program only needs to scan through the image two times to obtain the requisite discontinuity data: once to identify any binary thresholds and another to identify any local and directional gradients.

During the scan for local and directional gradients, each pixel in combination with a corresponding pixel structure of pixels is analyzed to determine whether a discontinuity resides at each pixel. The pixel structure includes a plurality of pixels that were previously analyzed.

The surface analysis program combines the binary thresholds, local gradients, and directional gradients to derive a surface damage index. Moreover, the program determines whether the surface is sufficiently continuous based upon the surface damage index and a predefined threshold. In the case where the surface analysis system is used for analyzing an optical fiber end face, optionally, the discontinuities can be weighted based upon their proximity of the discontinuities to the center of the fiber core. This feature provides an intelligent methodology for assimilating discontinuity data regarding an optical fiber end face in order to make decisions regarding whether or not the optical fiber end face is deficient and should be rejected.

The surface analysis system and method of the present invention have numerous advantages, a few of which are delineated hereafter, as mere examples.

An advantage of the surface analysis system and method is that discontinuities in a surface, such as an optical fiber end face, are automatically, contactlessly, and rapidly detected, classified, and evaluated to derive a single pass/fail conclusion regarding the surface.

Another advantage is that the surface analysis system and method achieve the fastest, most effective existing image processing cycle for fiber surface quantization.

Another advantage of the surface analysis system and method is that the fiber connector's translucent surface variations to changes in the level of the incident light are fully accounted for by using a gradient based memory structure.

Another advantage of the surface analysis system and method is that they utilize a single image scan of a memory array for identifying local and directional gradients, thus enhancing speed and minimizing computational requirements.

Another advantage of the surface analysis system and method is that they provide fiber optic transmission relevant data.

Other objects, features, and advantages of the present invention will become apparent to one with skill in the art upon examination of the following drawings and detailed description. It is intended that all such additional objects, features, and advantages be included herein within the scope of the present invention, as defined in the accompanying claims.

BRIEF DESCRIPTION OF THE DRAWINGS

The present invention can be better understood with reference to the following drawings. The drawings are not necessarily to scale, emphasis instead being placed upon clearly illustrating principles of the present invention. Furthermore, like reference numerals designate corresponding parts throughout the several views.

FIGS. 7A through 7E are schematic diagrams illustrating the pixel structure corresponding with each pixel p1-p16 of FIG. 6;

DETAILED DESCRIPTION OF THE PREFERRED EMBODIMENT

For purposes of discussion and illustration, the surface analysis system and method of the present invention will be described with reference to the analysis of an optical fiber end face. However, it should be emphasized that the surface analysis system and method can be used to analyze discontinuities in virtually any surface of an object, irrespective of its contour.

A. Optical Fiber Termination

Figure 1A:
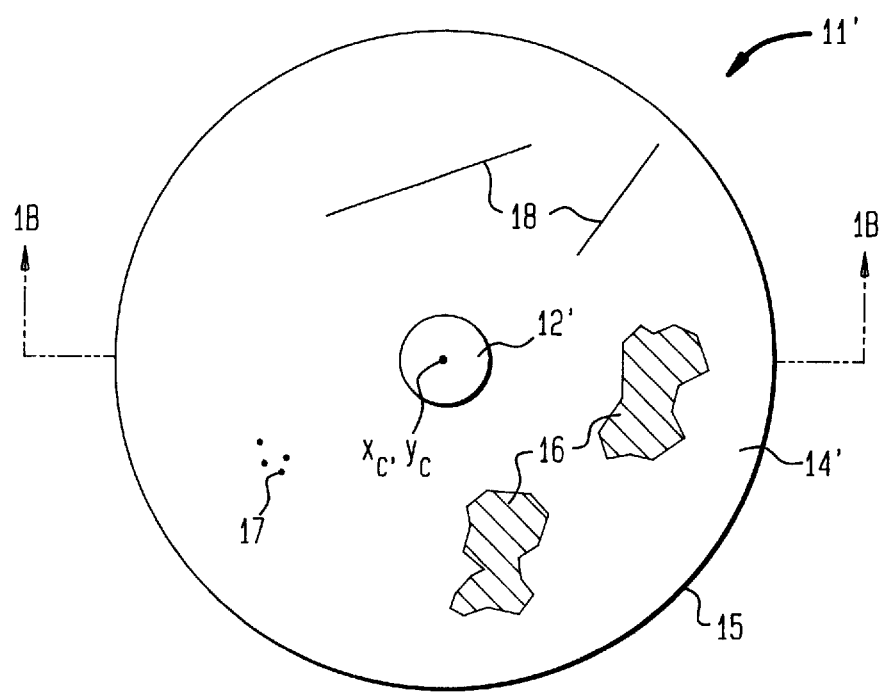
FIG. 1A is a front view of an optical fiber end face.
Figure 1B:
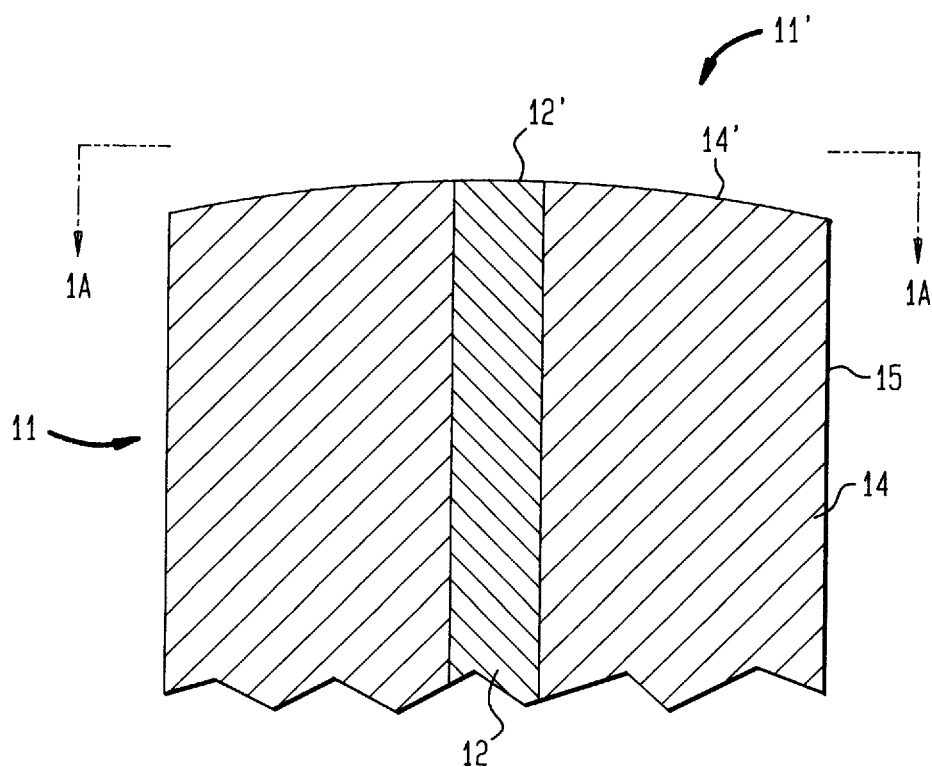
FIG. 1B is a transverse-sectional view of the optical fiber of FIG. 1A taken along line 1B—1B in FIG. 1A.

A conventional optical fiber termination 11 for a connector (not shown for simplicity), for example but not limited to, a ferrule connector, is illustrated in FIGS. 1A and 1B. The optical fiber termination 11 includes an elongated cylindrical core 12 that terminates at a core end face 12' surrounded by cladding 14 that terminates about the core end face 12' as a cladding end face 14'. Generally, the core end face 12' and the cladding end face 14' in combination form the termination end face 11', which is polished or otherwise processed so that it exhibits a continuous surface, free of scratches, cracks, chips, or pits. In current ferrule connectors, the end face 11' is usually domed, as shown in FIG. 1, or flat, but many other surface contours are possible and may be employed in the future.

B. Surface Analysis System

In accordance with the surface analysis system and method of the present invention, surface discontinuities are classified and quantified into three categories, unlike no other embodiment that is known in the art or industry. These three categories are binary thresholds, local gradients, and directional gradients, which are denoted by respective reference numerals 16, 17, 18 in FIG. 1A and which are described in detail hereafter.

A binary threshold 16 is a type of discontinuity resulting from severe cracks, chipping, or damage on the surface of the termination end face 11'. A binary threshold is defined as a plurality of pixel locations having intensities that differ by at least a predefined amount from an average of pixel intensities across generally the entire image of the fiber end face 11'. A binary threshold 16 can be linear or nonlinear, and can include an area of pixels.

A local gradient 17 is a type of discontinuity that results from surface texture and pitting. The dimension of a local gradient is one pixel. A local gradient is defined as a pixel location in an image having an intensity that differs by at least a predefined amount from intensities associated with all surrounding pixel locations.

A directional gradient 18 is a type of discontinuity resulting from scratches, lines, and minor cracks. Directional gradients are generated by gradients that are more than one pixel in dimension and generally follow a directional pattern. A direction gradient 18 is defined as a plurality of pixel locations having intensities that differ by at least a predefined amount from intensities associated with pixel locations situated about the directional gradient 18. A directional gradient 18 can be linear or nonlinear, and can include an area of pixels.

A primary difference between a directional gradient 18 and a binary threshold 16 is that a binary threshold 16 is determined by an analysis of a broad spectrum of pixels, i.e., generally the entire fiber image, whereas a directional gradient 18 is determined by an analysis of a local spectrum of pixels. Furthermore, the difference between the average intensity and either the upper or lower threshold (line of demarkation between binary threshold and not binary threshold) for determining binary thresholds 16 is larger than the difference between intensities that is utilized to identify directional gradients 18.

The aforementioned types of discontinuities can be used to fully describe the nature of discontinuities at the termination end face 11' and can be used, when combined with a weighting function, to determine the adequacy of the termination end face 11' for use in a connector.

Figure 2:
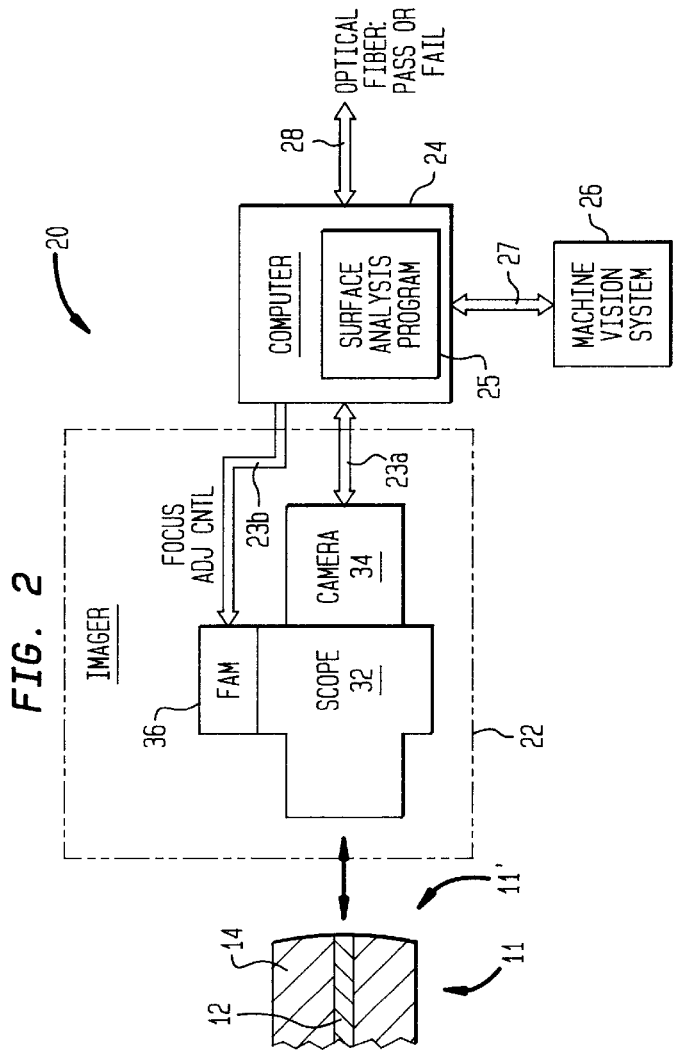
FIG. 2 is a block diagram of the surface analysis system of the present invention.

The surface analysis system 20 of the present invention is illustrated by way of a block diagram in FIG. 2. The surface analysis system 20 can determine automatically and contactlessly whether the optical fiber end face 11' has a continuous surface and is adequate or not for a connector based upon an image of the end face 11'. The surface analysis system 20 provides a single objective definitive conclusion regarding the fiber end face 11': pass or fail. In architecture, the surface analysis system 20 includes an imager 22 for capturing an image of the optical fiber end face 11', a computer 24 interfaced to the imager 22 for focusing the imager 22 and for receiving the image therefrom, and a machine vision system 26 interfaced to the computer 24 for processing the image under the control of the computer 24 and, particularly, the surface analysis program 25 so that a pass/fail conclusion is derived.

In the preferred embodiment, the imager 22 includes a scope 32, preferably a microscope with suitable magnification, for capturing an image of the termination end face 11', a camera 34 adapted to receive the image from the scope 32 and encode the image into electrical signal form, and a focus adjustment mechanism (FAM) 36 adapted to adjust the focus of the scope 32. The camera 34 can be any suitable imaging device for converting an optical image into an electrical signal, but is preferably a charge coupled device (CCD). The CCD camera 34 comprises a pixel array for receiving light. Moreover, the pixel array encodes the image by generating analog voltage signals proportional to the intensity of light at each pixel of the CCD, as is well known in the art.

The FAM 36 in the preferred embodiment can move the scope 32 or a part thereof along the longitudinal axis of the fiber termination 11 so that the lens configuration within the scope 32 is moved to or from the termination end face 11'. A suitable FAM 36 is a piezoelectric transducer that can selectively move the scope 32 a distance based upon a closed loop control signal of voltage. The computer 24 provides a focus adjustment control 23b to the FAM 36, which signal may be amplified and/or buffered in order to generate the voltage signal that is used to move the scope 32.

A suitable FAM 36 is a model P721.00 piezoelectric transducer, which is manufactured by Physik Instrumente, Germany. The foregoing piezoelectric transducer can selectively move the scope 32 a distance of about 100 microns (with a resolution of about 3 nanometers) based upon a closed loop control signal of voltage between 0 and 100 volts. When 0 volts is supplied to the piezoelectric transducer 36, the focal point of the scope 32 is maintained at its greatest distance (it is completely retracted) from its target, whereas when 100 volts is supplied to the piezoelectric transducer 36, the focal point of the scope 32 is the closest distance (full extension) to the target.

When the model P721.00 piezoelectric transducer is utilized, the FAM 36 is provided with an amplifier (not shown for simplicity) for amplifying the focus adjustment control signal 23b so that the output to the piezoelectric element is within the voltage range of 0–100 volts. A suitable amplifier is a model E860.10 amplifier manufactured by and commercially available from Physik Instrumente, Germany.

Figure 3:
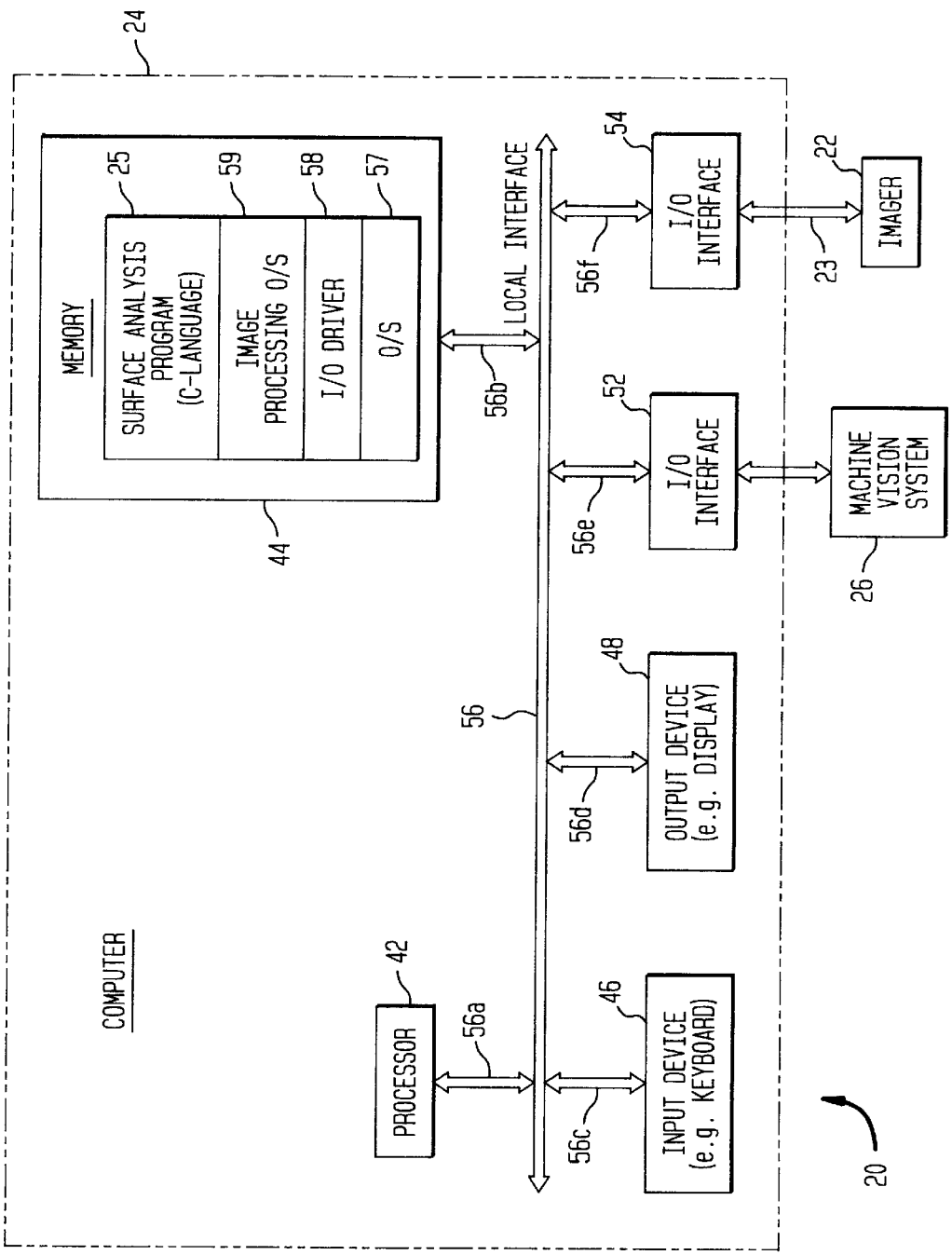
FIG. 3 is a block diagram illustrating the computer and the surface analysis program of FIG. 2.

The computer 24 can be any suitable computer system, many of which are known conventionally. A suitable computer is a model Globalyst 580 computer, which is commercially available from AT&T, USA. As shown in FIG. 3, the computer 24 includes a processor 42 for controlling and driving the computer 24 under the control of software and particularly the surface analysis program 25, a memory 44 for storing the software for driving the processor 42, an input device 46, for example, a keyboard, mouse, track ball, etc., for providing inputs to the computer 24, an output device 48, for example, a display, printer, etc., for permitting the computer 24 to output relevant data, particularly, the pass/fail conclusion, an input/output (I/O) interface 52 configured to provide an interface between the machine vision system 26 and the computer 24, an I/O interface 54 adapted to provide an interface between the imager 22 and the computer 24, and a local interface 56, which is preferably one or more buses, adapted to interface all of the aforementioned elements. It should be noted that all of the foregoing elements in this paragraph, except for the surface analysis program 25, are well known in the art.

As mentioned, the memory 44 includes the software for controlling and driving the processor 42. Particularly, the memory 44 includes any suitable operating system (O/S) 57 to serve as the fundamental software platform for operating the computer 24, an I/O driver 58 residing hierarchically and logically over the O/S 57 for controlling the I/O interfaces 52, 54 and communications to/from the imager 22 and machine vision system 26, an image processing O/S 59 residing hierarchically and logically over the I/O driver 58 for handling image processing, and the surface analysis program 25 residing hierarchically and logically over the image processing O/S 59 for implementing the novel surface analysis method of the present invention. The surface analysis program 58 derives the pass/fail conclusion regarding the optical fiber end face 11'. The program 58 will be described in detail later in this document with reference to FIGS. 8 through 12.

The program 58 as well as the other software in the memory 44 can be stored on any computer readable medium for use by or in connection with a computer related system or method. In the context of this document, a computer readable medium is an electronic, magnetic, optical, or other physical device or means that can contain or store a computer program for use by or in connection with a computer related system or method. Thus, for example, the novel program 58 can be stored and transported on a portable diskette, or as another example, the segment detection program could be stored in the memory of a computer, as is shown in FIG. 1, for the purpose of driving the computer when called upon.

The machine vision system 26 can be any suitable logic, processor, or computer that is conventional or custom made and that is configured to process the electrical signals from the imager 22. Many suitable machine vision systems are commercially available and their architectures and functionality are well known in the art. In the preferred embodiment, the machine vision system 26 is a model ITI ITEX OFG (overlay frame grabber) image processing card that is commercially available from Microdisk, Inc., U.S.A. This circuit board is plugged into the mother board associated with the computer 24.

C. Surface Analysis Method

The surface analysis method that is employed by the surface analysis program (FIG. 3) will now be described The surface analysis method detects and classifies discontinuities in the optical fiber end face 11' via two separate scans in any order through the image: once to identify any binary thresholds and another to identify any local and directional gradients.

Initially, a mask 62 having a circular aperture 64 is superimposed over the image so that the fiber end face 14' and core end face 12' can be analyzed exclusively of its surroundings. The mask 62 establishes a circular image disk 65 that will be analyzed. The fiber-to-plug transition 66, where epoxy is generally situated, is located within the expanse of the mask 62 and outside of the image disk 65, as is illustrated in FIG. 4, so that the transition 66 is eliminated from the analysis.

Binary thresholds 16 can be determined using any suitable technique. Many known techniques could be adapted to identify binary thresholds, as were previously defined herein. In the preferred embodiment, the binary thresholds are determined by first averaging pixel values in the image. During the scan, each pixel value is then compared to the average. If a pixel value is equivalent to the average within a predefined threshold, then the pixel is considered to be free of binary thresholds. Alternatively, if the pixel value is unequivalent to the average within a predefined threshold, then the pixel is considered to be part of a binary threshold.

Figure 4:
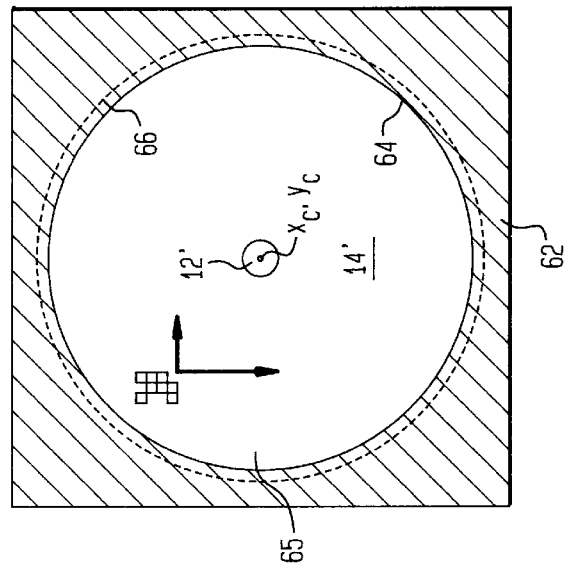
FIG. 4 is a schematic diagram illustrating the single pass scan method that is performed by the surface analysis program of FIG. 2 to identify local and directional gradients.
Figures 5, 6:
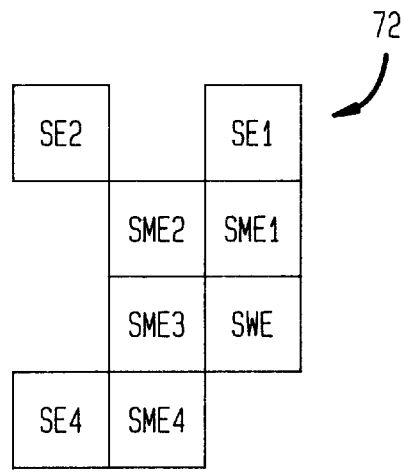
FIG. 5 is a schematic diagram illustrating the pixel structure of pixels that is analyzed for each pixel during the single pass scan of FIG. 4.
FIG. 6 is a schematic diagram of an example of possible pixel values.

During the scan for locating local and directional gradients 17, 18, a pixel structure 72 of pixel values, as is illustrated in FIG. 5, is utilized for analyzing each pixel during the scan of the image disk 65 of FIG. 4. As is illustrated in FIG. 5, the pixel structure 72 includes: (a) a structure working element SWE, which represents the pixel that is currently being analyzed; (b) four structure memory elements SME1–SME4, which are utilized to determine whether the SWE is a local gradient or part of a directional gradient; and (c) three satellite elements SE1–SE3, which are utilized to determine whether or not the SWE is tentatively a gradient pixel (a local gradient or part of a directional gradient) Use of the pixel structure 72 and its pixel components SWE, SME1–SME4, and SE1–SE3 will be further clarified hereafter.

As further illustrated in FIG. 4, the pixel structure 72 is moved through the image disk 65 in a raster manner, for example but not limited to, scanning pixels along vertical lines from top to bottom and then moving between vertical lines from left to right, so that all the necessary information regarding local and directional gradients is retrieved by a single pass of the pixel structure 72 through the image disk 65. The two outermost pixels around the periphery of the image disk 65, or the two nearest pixels from the mask 62 within the aperture 64, are not analyzed in the scan, but are part of the analysis. In other words, the two nearest pixels from the mask 62 are never defined as the SWE, but are used as SE1–SE3, SME1–SME4, when the SWE is 3and 4 pixels from the mask 62.

At each location of the pixel structure 72 in the image, the analysis of the SWE, SME1–SME4, and SE1–SE3 is as follows. First, an average of the satellite elements SE1–SE3 is computed and compared to the structure working element SWE. If the SE average is within a predefined range of the SWE, then it is concluded that no local gradient or directional gradient is present. Mathematically, the foregoing process can be expressed as follows:

$$\frac{SE1 + SE2 + SE3}{3} - T_{SE,L} \leq SWE \leq \frac{SE1 + SE2 + SE3}{3} + T_{SE,H} \quad (1)$$

where $T_{SE,L}$ is the low tolerance threshold, i.e., the amount in which the SE average must differ from the SWE at the lower end before it is concluded that a gradient exists and where $T_{SE,H}$ is the high tolerance threshold, i.e., the amount in which the SE average must differ from the SWE at the high end in order for a gradient to be concluded. If it is determined that the SWE is(sufficiently different than the SE average based upon the thresholds $T_{SE,L}$, $T_{SE,H}$ then the SWE is tentatively considered a gradient.

In the case when the SWE is tentatively considered a gradient, the SWE is then compared to the structure memory elements SME1–SME4 in order to determine whether the SWE will (a) be classified as a local gradient, (b) be classified as part of a directional gradient, or (c) be reclassified as a nongradient. If the comparison between the SWE and each SME yields a conclusion that the SWE is different from all SMEs as defined by a predetermined threshold, then the SWE is considered a local gradient. If the comparison yields a conclusion that the SWE is equivalent to any SME as defined by a predetermined threshold and the SME is a gradient, then the SWE is considered to be part of the directional gradient corresponding with the one or more SMEs that yielded the result. Also, the one or more SMEs that yielded the result are reclassified as directional gradients, if currently classified as a local gradient. Furthermore, if the comparison yields a conclusion that the SWE is equivalent to any SME as defined by a threshold and the SME is a nongradient, then the SWE is deemed to be a nongradient.

The aforementioned threshold concepts can be expressed mathematically as follows:

$$SME1 - T_{SME,L} \leq SWE \leq SME1 + T_{SME,H} \quad (2)$$

$$SME2 - T_{SME,L} \leq SWE \leq SME2 + T_{SME,H} \quad (3)$$

$$SME3 - T_{SME,L} \leq SWE \leq SME3 + T_{SME,H} \quad (4)$$

$$SME4 - T_{SME,L} \leq SWE \leq SME2 + T_{SME,H} \quad (5)$$

where $T_{SME,L}$ is the low tolerance threshold and $T_{SME,H}$ is the high tolerance threshold for the SME analysis relative to SWE.

To better understand the surface analysis method, a specific example is described hereafter.

EXAMPLE

For purposes of discussion, assume that an image 74 of FIG. 6 has been captured. Each block 76 in the image 74 represents a pixel. Moreover, the number (i.e., 1, 3, 7, 9, 10, or 12) within each block 76 represents a pixel value for its corresponding pixel.

For this example, assume that the pixel structure 72 (FIG. 5) will be scanned through the square pixel array denoted by pixels p1–p16 in FIG. 6. Further assume that the SE low tolerance threshold $T_{SE,L}=3$, the SE high tolerance threshold $T_{SE,H}=3$, the SME low tolerance threshold $T_{SME,L}=2$, and the SME high tolerance threshold $T_{SME,H}=2$.

Note that in the discussion of this example that follows, reference will be made to FIGS. 7A through 7E.

Pixel p1

Figure 7A:
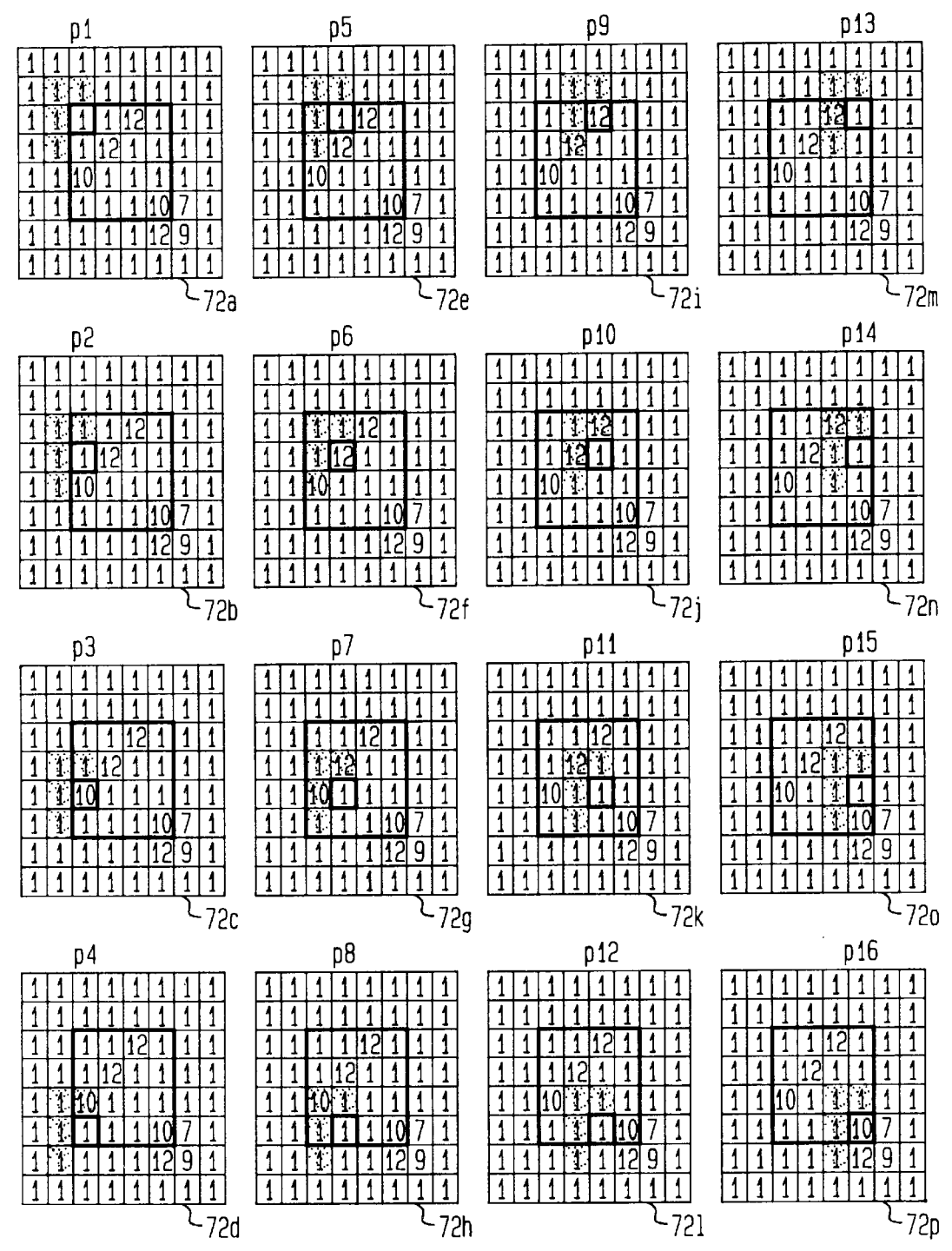

The pixel structure for pixel p1 is indicated at reference numeral 72a in FIGS. 7A and 7B.

The SE average is as follows:

$$\frac{SE1 + SE2 + SE3}{3} = 1$$

Equation (1) yields the following:

$$-2 \leq 1 \leq 4$$

Because equation (1) yields a true result, no gradient (local or directional gradient) is present at pixel p1. The next pixel p2 is analyzed.

Pixel p2

The pixel structure for pixel p2 is indicated at reference numeral 72b in FIG. 7A and 7B.

The SE average is as follows:

$$\frac{SE1 + SE2 + SE3}{3} = 1$$

Equation (1) yields the following:

$$-2 \leq 1 \leq 4$$

Because equation (1) yields a true result, no gradient is present at pixel p2. The next pixel p3 is analyzed.

Pixel p3

The pixel structure for pixel p3 is indicated at reference numeral 72c in FIG. 7A and 7B.

The SE average is as follows:

$$\frac{SE1 + SE2 + SE3}{3} = 1$$

Equation (1) yields the following:

$$-2 \leq 10 \leq 4$$

Because equation (1) yields an untrue result, a tentative gradient is concluded at the pixel p3.

Equations (2), (3), and (4) yield the following:

$$-1 \leq 10 \leq 3$$

Further, equation (5) yields the following:

$$1 \leq 10 \leq 5$$

Because equations (2)–(5) yield an untrue result, the tentative gradient is concluded as a local gradient, and not a directional gradient. The next pixel p4 is analyzed.

Pixel p4

The pixel structure for pixel p4 is indicated at reference numeral 72d in FIG. 7A and 7B.

The SE average is as follows:

$$\frac{SE1 + SE2 + SE3}{3} = 1$$

Equation (1) yields the following:

$$-2 \leq 1 \leq 4$$

Because equation (1) yields a true result, no gradient is present at pixel p4. The next pixel p5 is analyzed.

Pixel p5

The pixel structure for pixel p5 is indicated at reference numeral 72e in FIG. 7A and 7C.

The SE average is as follows:

$$\frac{SE1 + SE2 + SE3}{3} = 1$$

Equation (1) yields the following:

$$-2 \leq 1 \leq 4$$

Because equation (1) yields a true result, no local gradient is present at pixel p5. The next pixel p6 is analyzed.

Pixel p6

The pixel structure for pixel p6 is indicated at reference numeral 72f in FIG. 7A and 7C.

The SE average is as follows:

$$\frac{SE1 + SE2 + SE3}{3} = 1$$

Equation (1) yields the following:

$$-2 \leq 12 \leq 4$$

Because equation (1) yields a untrue result, a tentative gradient is concluded at pixel p6.

Equations (2), (3), (4) yield the following:

$$-1 \leq 12 \leq 3$$

Equation (5) yields the following:

$$8 \leq 12 \leq 12$$

Because equation (5) yields a true result, because SME4 was classified previously as a gradient, and because equations (2), (3), and (4) do not yield a true result, then it is concluded that a directional gradient extends from pixel p3 to pixel p6. In other words, pixel p6 is identified as part of a directional gradient, and because pixel p3 has already been scanned, a determination is made as to whether pixel p3 has been identified as a directional gradient. If it is not, as in the present example, then it is reclassified from a local gradient to a directional gradient.

The next pixel p7 is now analyzed.

Pixel p7

The pixel structure for pixel p7 is indicated at reference numeral 72g in FIG. 7A and 7C.

The SE average is as follows:

$$\frac{SE1 + SE2 + SE3}{3} = \frac{5}{3}$$

Equation (1) yields the following:

$$-\frac{4}{3} \leq 1 \leq \frac{14}{3}$$

Because equation (1) yields a true result, no local gradient is present at pixel p7. The next pixel p8 is analyzed.

Pixel p8

The pixel structure for pixel p8 is indicated at reference numeral 72h in FIG. 7A and 7C.

The SE average is as follows:

$$\frac{SE1 + SE2 + SE3}{3} = \frac{14}{3}$$

Equation (1) yields the following:

$$\frac{5}{3} \leq 1 \leq \frac{23}{3}$$

Because equation (1) yields a untrue result, a tentative gradient is concluded.

Equations (2), (4), and (5) yield the following:

$$-1 \leq 1 \leq 3$$

Moreover, equation (3) yields the following:

$$8 \leq 1 \leq 12$$

Because equations (2), (4), and (5) yield a true result and corresponding SME1–SME3 are nongradients, then it is concluded that no gradient exists at pixel p8. The scan proceeds to pixel p9.

Pixel p9

The pixel structure for pixel p9 is indicated at reference numeral 72i in FIG. 7A and 7D.

The SE average is as follows:

$$\frac{SE1 + SE2 + SE3}{3} = 1$$

Equation (1) yields the following:

$$-2 \leq 12 \leq 4$$

Because equation (1) yields a untrue result, a tentative gradient is concluded.

Equations (2), (3), and (4) yield the following:

$$-1 \leq 12 \leq 3$$

Equation (5) yields the following:

$$10 \leq 12 \leq 14$$

(31)

Because equation (5) yields a true result, because ME4 corresponding to equation (5) is a gradient, and because equations (2), (3), and (4) yield an untrue result, the pixel p9 is classified as being part of a directional gradient. The directional gradient spans from at least pixel p6 to pixel p9. Further, because pixel p6 has already been scanned, a determination is made as to whether pixel p6 has been identified as a directional gradient. If it is not, then it is reclassified from a local gradient to a directional gradient. In this case, it has already been classified as a directional gradient.

The next pixel p10 is analyzed.

Pixel p10

The pixel structure for pixel p10 is indicated at reference numeral 72j in FIG. 7A and 7D.

The SE average is as follows:

$$\frac{SE1 + SE2 + SE3}{3} = 4$$

Equation (1) yields the following:

$$1 \leq 1 \leq 7$$

Because equation (1) yields a true result, no gradient is present at pixel p10. The next pixel p11 is analyzed.

Pixel p11

The pixel structure for pixel p11 is indicated at reference numeral 72k in FIG. 7A and 7D.

The SE average is as follows:

$$\frac{SE1 + SE2 + SE3}{3} = \frac{14}{3}$$

Equation (1) yields the following:

$$\frac{5}{3} \leq 1 \leq \frac{23}{3}$$

Because equation (1) yields a untrue result, a tentative gradient is concluded.

Equations (2), (4), and (5) yield the following:

$$-1 \leq 1 \leq 3$$

Moreover, equation (3) is as follows:

$$10 \leq 1 \leq 14$$

Equations (2), (4), and (5) yield a true result, while equation (3) yields an untrue result. Because equations (2), (4), and (5) yielded a true result and because corresponding ME1, ME3, and ME4 are nongradients, then it is concluded that no gradient exists at pixel p8.

The scan proceeds to pixel p9.

Pixel p12

The pixel structure for pixel p12 is indicated at reference numeral 72l in FIG. 7A and 7D.

The SE average is as follows:

$$\frac{SE1 + SE2 + SE3}{3} = 1$$

Equation (1) yields the following:

$$-2 \leq 1 \leq 4$$

Because equation (1) yields a true result, no gradient is present at p12. The next pixel p13 is analyzed.

Pixel p13

The pixel structure for pixel p13 is indicated at reference numeral 72m in FIG. 7A and 7E.

The SE average is as follows:

$$\frac{SE1 + SE2 + SE3}{3} = \frac{14}{3}$$

Equation (1) yields the following:

$$\frac{5}{3} \leq 1 \leq \frac{23}{3}$$

Because equation (1) yields a untrue result, a tentative gradient is concluded.

Equations (2), (3), and (5) yield the following:

$$-1 \leq 1 \leq 3$$

Moreover, equation (4) is as follows:

$$10 \leq 1 \leq 14$$

Equations (2), (3), and (5) yield a true result, while equation (4) yields an untrue result. Because equations (2), (3), and (5) yielded a true result and because the corresponding SME1, SME2, and SME4 were previously determined as nongradients, then it is concluded that no gradient exists at pixel p13. The scan proceeds to pixel p14.

Pixel p14

The pixel structure for pixel p14 is indicated at reference numeral 72n in FIG. 7A and 7E.

The SE average is as follows:

$$\frac{SE1 + SE2 + SE3}{3} = 1$$

Equation (1) yields the following:

$$-2 \leq 1 \leq 4$$

Because equation (1) yields a true result, no gradient is present at p14. The next pixel p15 is analyzed.

Pixel p15

The pixel structure for pixel p15 is indicated at reference numeral 72o in FIG. 7A and 7E.

The SE average is as follows:

$$\frac{SE1 + SE2 + SE3}{3} = 1$$

Equation (1) yields the following:

$$-2 \leq 1 \leq 4$$

Because equation (1) yields a true result, no gradient is present at p15. The next pixel p16 is analyzed.

Pixel p16

The pixel structure for pixel p16 is indicated at reference numeral 72p in FIG. 7A and 7E.

The SE average is as follows:

$$\frac{SE1 + SE2 + SE3}{3} = \frac{14}{3}$$

Equation (1) yields the following:

$$\frac{5}{3} \leq 10 \leq \frac{23}{3}$$

Because equation (1) yields a untrue result, a tentative local gradient is concluded at pixel p16.

Equations (2)–(5) yield the following:

$$-1 \leq 10 \leq 3$$

Because equations (2) through (5) yield a untrue result, then it is concluded that a local gradient exists at pixel p16.

As is apparent from the foregoing example, the local gradients and directional gradients are identified via a single pass of the pixel structure 72 through the image 74.

After the binary thresholds 16, local gradients 17, and directional gradients 18 have been identified in the image, this information can be utilized to determine the adequacy of the end face 11' as a junction in a connector. None of the known prior art classifies discontinuities into the foregoing categories.

The binary thresholds, local gradients, and directional gradients can be combined in any logical manner in order to determine the adequacy of the end face 11'. In the preferred embodiment and best mode of the invention, the binary thresholds 16, local gradients 17, and directional gradients 18 are weighted depending upon their proximity to the core end face 12'. In general, the closer that the discontinuity is to the core end face 12', the greater weight that is attributed to the discontinuity in determining the surface damage. Such a scheme is set forth in copending application entitled, "Surface Quality Grading System and Method", filed the same day as the instant application, by Csipkes, Mufti, and Palmquist, the disclosure of which is incorporated herein by reference.

However, it should be noted that numerous other methods could be employed for combining the three categories of discontinuities. As an example, one method might be to reject an end face 11' as being too damaged if a predefined number of pixels fall within one of the three categories: binary threshold 16, local gradient 17, or directional gradient 18. The list of possible methods is endless.

D. Surface Analysis Program

The surface analysis program 25 (FIG. 2) in the preferred embodiment and best mode of the invention will now be described in detail hereafter with reference to FIGS. 8 through 12. In the flow charts of these figures, flow chart blocks represent blocks or subroutines of executable code for driving the computer 24 and the machine vision system 26.

Generally, the surface analysis program 25 (FIGS. 2 and 3) implements the novel surface analysis method as described previously in order to identify binary thresholds 16, local gradients 17, and directional gradients 18. The binary thresholds 16 are identified during one scan, and the local and directional gradients 17, 18 are identified during another scan, or during a single pass of the pixel structure 72 through the image.

Figure 8:
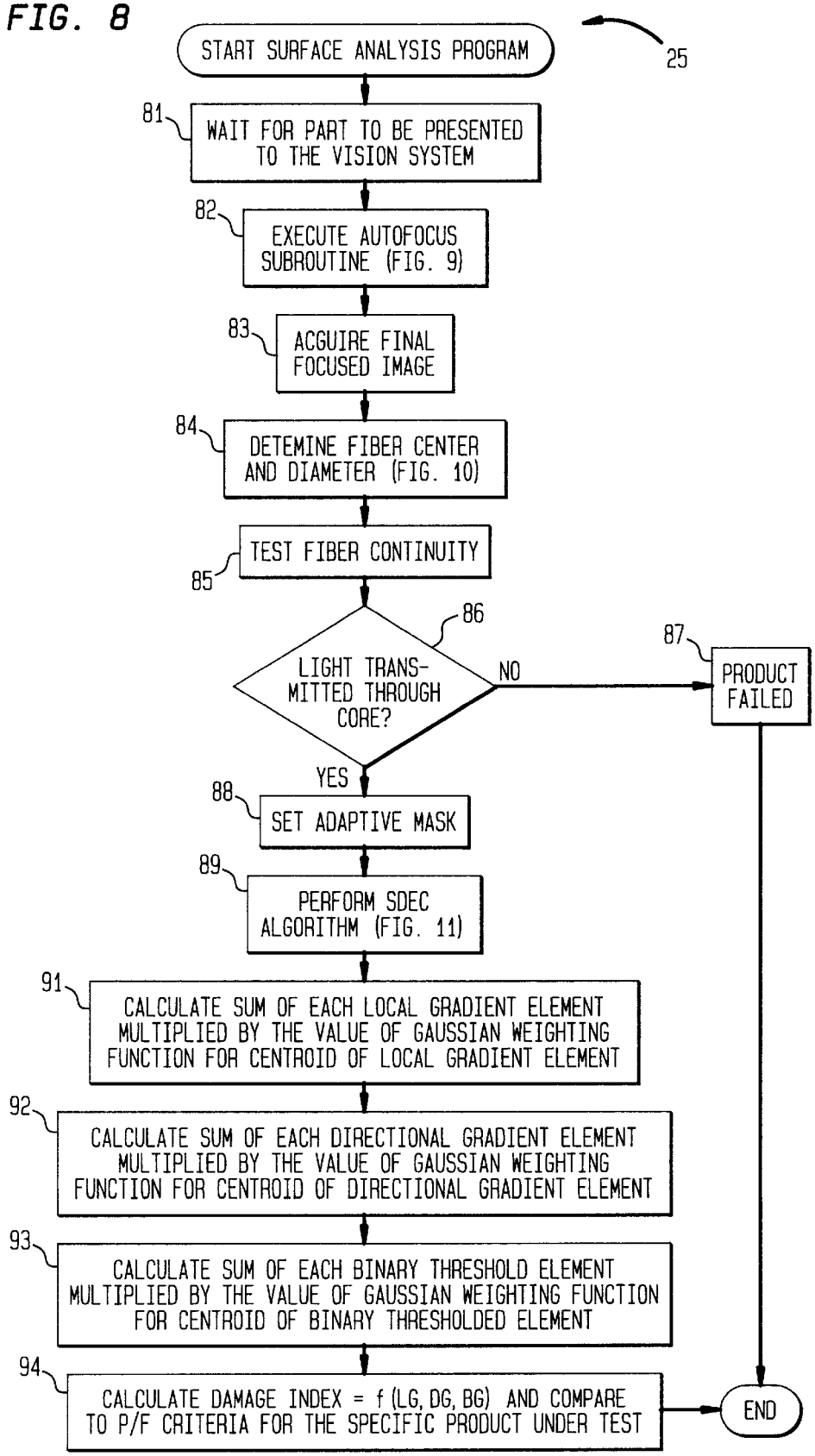
FIG. 8 is a flow chart illustrating the surface analysis program of FIGS. 2 and 3.

Initially, the surface analysis program 25 waits for the termination end face 11' to be presented to the imager 22, as indicated at block 81 in FIG. 8. An input may be provided to the computer 24 via the input device 46 (FIG. 3) in order to initiate the program 25 past block 81. Alternatively, an automatic sensing system could be employed to produce such an input. The latter is desirable in a fully automated assembly line. Once an input is received, block 81 transfers to block 82.

Next, at block 82, an autofocus subroutine is employed so as to bring the end face 11' into proper focus. Any suitable autofocus method may be employed. Several embodiments are described hereafter with reference to FIG. 9. After focusing, block 82 transfers to block 83.

At block 83 in FIG. 8, the optimally focused image is acquired by the surface analysis program 25 for analysis. Block 83 transfers to block 84.

At block 84, the fiber center $x_c, y_c$ and the fiber diameter are determined based upon the optimally focused image. Any suitable technique can be employed for accomplishing this task. An example of a process that is utilized in the preferred embodiment will be described hereinafter with reference to FIG. 84. At the conclusion of the code in block 84, block 84 transfers to block 85.

At blocks 85 and 86, the fiber termination 11 is tested in a rudimentary manner for continuity by passing light therethrough and examining the pixel intensities in the fiber image resulting from the passage of light. In the preferred embodiment, light is propagated into another end of the fiber that leads to the termination 11, by the block 86. Furthermore, if sufficient light, as determined by a predefined threshold and gradient analysis, passes through the end face 11' and into the scope 32, then the fiber termination 11 has passed this initial stage of examination. In this event, block 86 transfers to block 88. If, however, insufficient light passes through the end face 11', then block 86 transfers to block 87, which drives a product failure message to the user via output device 48 (FIG. 3) and the program 25 concludes.

When the fiber termination 11 passes this initial continuity test and block 88 is executed, an adaptive mask 62 (FIG. 4) is employed to mask out analysis of any pixels outside the area of the end face 11' in the image. The mask 62 is placed over the image so that the mask covers the fiber/plug boundary 66 (FIG. 4). Essentially, equation (4) hereinafter is implemented. Block 88 transfers to block 89.

At block 89, the image is scanned in order to generate the binary thresholds 16 ($gb_{ij}$), local gradients 17 ($gl_{ij}$), and directional gradients 18 ($gd_{ij}$) at the locations ($x_i$, $y_j$) of the image, where i=1 ... $n_x$ runs in the horizontal directional and j=1 ... $n_y$ runs in the vertical direction, and where $n_x$ and $n_y$ are the maximum number of pixels in the horizontal and vertical directions, respectively. In the preferred embodiment, an SDEC subroutine is employed, as will be described later in detail in this document with reference to FIG. 11. However, it should be appreciated that many other techniques could be employed to identify the locations and pixel intensity values of the binary thresholds 16 ($gb_{ij}$), local gradients 17 ($gl_{ij}$), and directional gradients 18 ($gd_{ij}$) to practice the present invention.

Block 89 transfers to block 91. At code blocks 91 through 93, the indices $K_L$, $K_D$, and $K_B$ are calculated based on the values of $gl_{ij}$, $gd_{ij}$ and $gb_{ij}$ as follows:

$$K_L = \sum_{i=1}^{n_x} \sum_{j=1}^{n_y} gl_{i,j} m_{i,j} e^{\frac{-[(x_i - x_c)^2 + (y_i - y_c)^2]}{\beta}} \quad (6)$$

$$K_D = \sum_{i=1}^{n_x} \sum_{j=1}^{n_y} gd_{i,j} m_{i,j} e^{\frac{-[(x_i - x_c)^2 + (y_i - y_c)^2]}{\beta}} \quad (7)$$

$$K_B = \sum_{i=1}^{n_x} \sum_{j=1}^{n_y} gb_{i,j} m_{i,j} e^{\frac{-[(x_i - x_c)^2 + (y_i - y_c)^2]}{\beta}} \quad (8)$$

$\beta$=constant sensitivity factor
$gl_{ij}$=value of local gradient at location ($x_i$, $y_i$)
$gd_{ij}$=value of bidirectional gradient at location ($x_i$, $y_i$)
$gb_{ij}$=value of binary threshold at location ($x_i$, $y_i$)
$x_c, y_c$=location of fiber center
$x_i, y_i$=location of a pixel in image
and $m_{ij}$ is a fiber disk mask given by:

$$m_{i,j}=0, \text{ for } (x_i - x_c)+(y_j - y_c)>R_f, 1, \text{ for } (x_i - x_c)+(y_j - y_c) \leq R_f \quad (9)$$

The constant sensitivity factor $\beta$ is 10,000 in the preferred embodiment, but many other values are obviously possible, and affects the shape of and weighting applied by the gaussian function. FIG. 4A shows the weighting when the constant sensitivity factor $\beta$ is 10,000, denoted by $\beta_1$. Further, FIG. 4B shows the weighting when the constant sensitivity factor $\beta$ is 40,000, denoted by $\beta_2$. When the sensitivity factor $\beta$ is high, the value of the e-exponent is small and the gaussian function exhibits a relatively flatter shape. Conversely, when the sensitivity factor $\beta$ is low, the value of the e-exponent is large and the gaussian function exhibits a much more peak-like shape.

Implementation of the aforementioned equations is accomplished as follows. At block 91, a local gradient table, or array, is assembled. In this regard, each local gradient value $gl_{ij}$ is weighted by a corresponding weight k, where the weight $k=e^{-[(xi-xc)2+(yi-yc)2]/\beta}$, which depends upon the local gradient's proximity to the fiber center $x_c, y_c$. The resultant weighted local gradient values are placed in the local gradient table. Next, the local gradient index $K_L$ is computed by adding together the weighted local gradient values from the local gradient table. Block 91 transfers to block 92.

At block 92, a directional gradient table, or array, is assembled. In this regard, each directional gradient value $gd_{ij}$ is weighted by a corresponding weight k, where the weight $k=e^{-[(xi-xc)2+(yi-yc)2]/\beta}$, which depends upon the directional gradient's proximity to the fiber center $x_c, y_c$. The resultant weighted directional gradient value is placed in the directional gradient table. Next, the directional gradient index $K_D$ is computed by adding together the weighted directional gradient values from the directional gradient table. Block 92 transfers to block 93.

At block 93, a binary threshold table, or array, is assembled. In this regard, each binary threshold value $gb_{ij}$ is weighted by a corresponding weight k, where the weight $k=e^{-[(xi-xc)2+(yi-yc)2]/\beta}$, which depends upon the binary threshold's proximity to the fiber center $x_c, y_c$. The resultant weighted binary threshold value is placed in the binary threshold table. Next, the binary threshold index $K_B$ is computed by adding together the weighted binary threshold values from the binary threshold table. Block 93 transfers to block 94.

At block 94, the final value of the surface damage index $\psi$ is obtained by a weighted sum of the individual indices as follows:

$$\psi = K_L + W(K_D + K_B) \quad (10)$$

Moreover, the surface damage index $\psi$ is compared to the pass/fail threshold $T_{pf}$ to determine whether the termination end face 11'. Hence, the discontinuity information (i.e., binary thresholds 16, local gradients 17, directional gradients 18) is combined in order to derive a pass/fail conclusion regarding the end face 11'. If $\psi$ is greater than or equal to $T_{pf}$, then the termination end face 11' fails. Alternatively, when the surface damage index $\psi$ is less than the threshold $T_{pf}$, then the termination 11' passes.

The pass/fail conclusion is driven to the output device 48 (FIG. 3) by the program 25. Hence, automatically and contactlessly, the end face 11' has been analyzed and a definitive conclusion has been reached regarding the adequacy of the end face 11' as a junction in a connector.

Note that it has been empirically determined by the inventors that the indices $K_L$ and $K_D$ are highly correlated, based upon their definitions and, therefore, there is a need for only a single weight W in the equation (5) above. The weight W is calculated from a formula which is based on a first order approximation of the relationship between return loss, the directional gradient index $K_D$, and the local gradient index $K_L$, as described hereafter.

First, a sample of connectors with similar geometric characteristics is chosen. These characteristics include, for example but not limited to, fiber type (e.g., domed or flat); the degree of eccentricity (deviation of fiber core relative to the center of the ferrule, or plug; the degree of undercut or protrusion of the fiber core relative to the surrounding fiber surface, and the existence or nonexistence of microbends.

Next, the indices $K_L$ and $K_D$ are calculated for each of the sample connectors. The return loss for the sample connectors is computed. The indices $K_L$ and $K_D$ are plotted versus the return loss. Lines are fitted to $K_L$ and $K_D$ and their slopes are calculated as $m_1$ and $m_2$, respectively. Finally, the weight W is computed as the ratio of $m_1$ to $m_2$, or $W = m_1/m_2$.

1. Autofocus Subroutine

Figure 9:
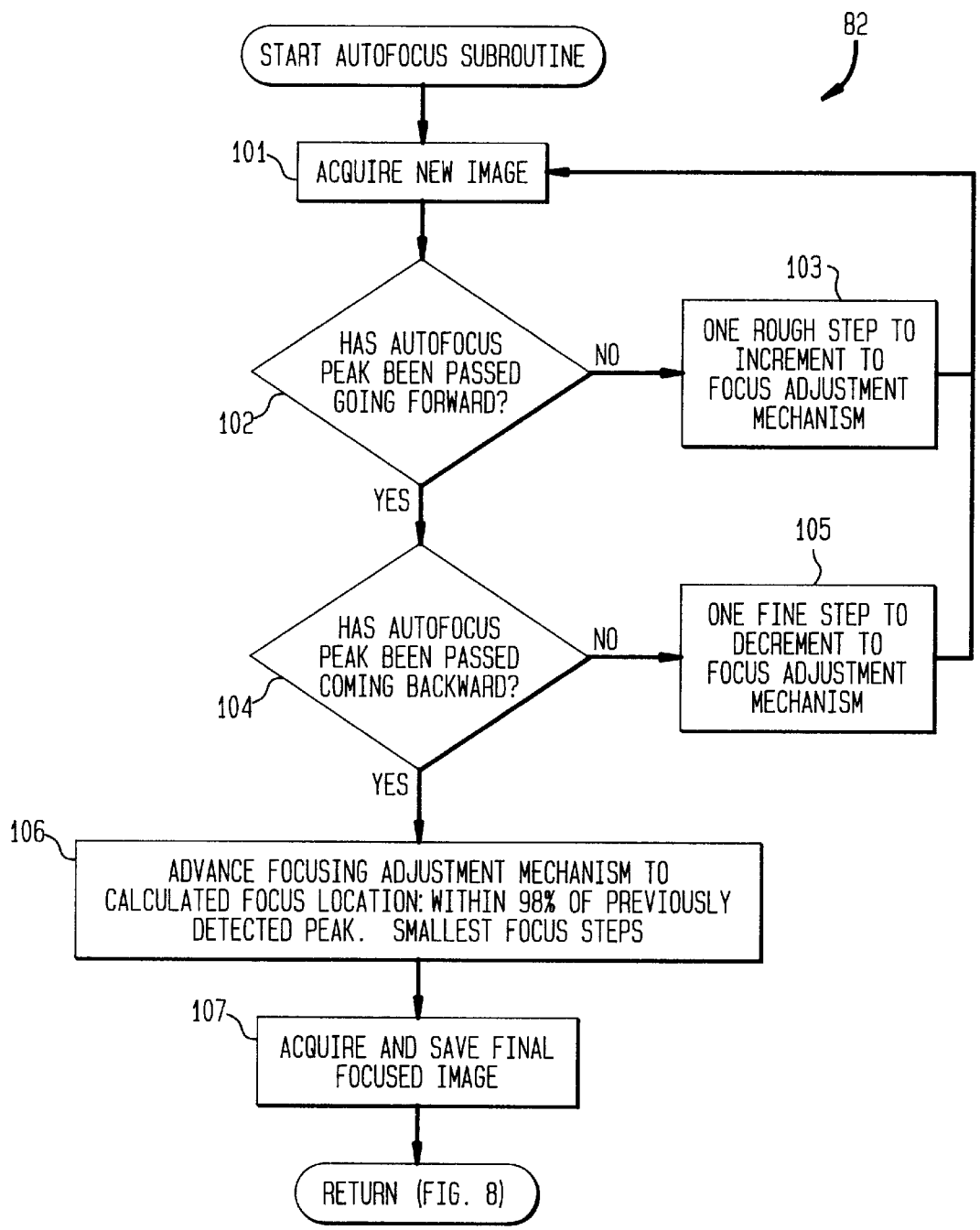
FIG. 9 is a flow chart illustrating the autofocus subroutine of FIG. 8.

FIG. 9 illustrates in detail the code block 82 (FIG. 8) regarding the determination of the optimal focus point for the scope 32 relative to the end face 11' (FIG. 2). Any suitable autofocus method may be employed.

One suitable autofocus technique is as follows. The FAM 36 (FIG. 2) is utilized to move the imager 22 relative to the termination end face 11' by increments, and after movement by each increment, the focus of the image is checked via gradient analysis along one or more lines, preferably 3 horizontal and 3 vertical lines, spanning across the image. The gradient is the change, or difference in value, between a pixel value and the value of an adjacent pixel along a particular direction. A gradient would exist and be detected, for example, at the boundary between the fiber cladding and the bore of the ferrule, or plug.

Preferably, with this autofocusing technique, the FAM 22 is initialized so that the imager 22 is located the furthest distance away from the termination end face 11', and then the imager 22 is moved incrementally toward the termination end face 11', while monitoring gradient changes in the image. After each image is captured, the gradients along each of the one or more lines are determined, and the absolute value of the gradients is summed. In essence, the image having the largest gradient sum is the image with the best focus. After it is determined that the focus peak has been passed after movement by an increment and a decline in the gradient sum, the FAM 36 is controlled to move the imager 22 back to the optimal focus position, and the focused image is captured by the camera 34 by code block 63. Block 63 transfers to block 64.

Another suitable autofocusing method (best mode at present) is described as follows with reference to FIG. 9. In this method, the FAM 36 (FIG. 2) is again utilized to move the imager 22 relative to the termination end face 11' by increments, and after movement by each increment, the focus of the image is checked via gradient analysis along one or more lines, preferably 3 horizontal and 3 vertical lines, spanning across the image. However, there are some differences, as compared to the previously described method that enhance the speed and accuracy of the autofocusing step.

Referring to FIG. 9, first, at block 101, the FAM 36 is initialized at a position furthest away from the end face 11', and an image is acquired. Block 101 transfers to block 102. At block 102, an inquiry is made as to whether a forward autofocus peak has been passed by predefined amount based upon the gradient analysis. In the preferred embodiment, it is concluded that the gradient peak has been passed when the gradient sum reaches about 80 percent of any previous maximum gradient sum value.

When it is determined that the forward autofocus peak has not yet been passed at block 102, then block 102 transfers to block 103, and the FAM 36 is commanded by block 103 to move the scope 32 by one rough step increment forward so that the scope is moved in a forward direction closer to the end face 11'. At this point, block 103 transfers to block 101, and another image is retrieved by block 101. The foregoing process continues until the forward autofocus peak has been passed.

When the forward autofocus peak has been passed as determined by block 102, the subroutine 82 enters a loop where the FAM 36 is commanded to move the scope 32 by fine step increments backward so that the scope is moved slightly away from the end face 11'. Note that the fine step increments are smaller than the rough step increments previously described. For the remainder of the algorithm, the FAM 36 is commanded to move in fine step increments in order to focus in on the optimum autofocus peak.

Block 102 transfers to block 104 when the forward autofocus peak has been passed. Block 104 makes a determination as to whether the backward autofocus peak has been passed. In the preferred embodiment, the backward autofocus peak is defined as about 90 percent of any previous maximum gradient sum value.

When the backward autofocus peak has not been passed, then block 104 transfers to block 105, and the FAM 36 is commanded to move the scope 32 in the backward direction by a fine step increment away from the end face 11' by block 105. Moreover, block 105 transfers to block 101, and another image is acquired and stored by block 101. The foregoing analysis is repeated until the backward autofocus peak is passed.

When the backward autofocus peak has been passed, then block 104 transfers to block 106, and the FAM 36 is controlled by block 106 to move the scope 32 in a forward direction in the smallest step increments so that the scope 32 moves closer to the end face 11'. In the preferred embodiment, the smallest step increments are smaller than the rough and fine step increments. Moreover, the optimal focus position is identified when the gradient sum is about 98 percent of any previous maximum gradient sum value.

Finally, when the optimal focus position has been achieved, block 106 transfers to block 107, which saves the focused image for future analysis. The subroutine 82 then concludes and control returns to block 63 in FIG. 8.

2. Fiber Core And Fiber Diameter Determination Subroutine

Figure 10:
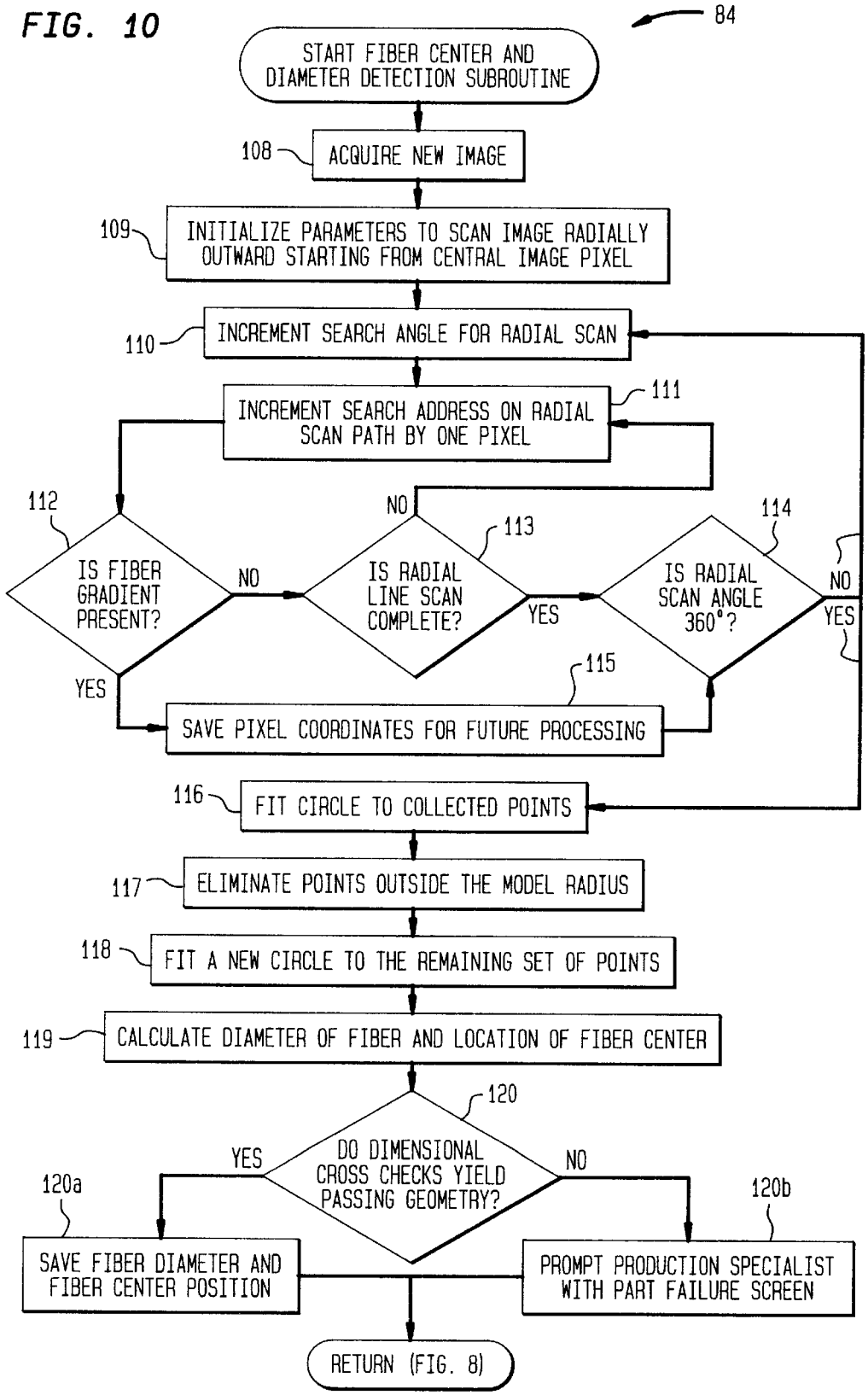
FIG. 10 is a flow chart illustrating the a fiber center and diameter determination subroutine of FIG. 8.

FIG. 10 illustrates in detail the analysis performed in code block 84 (FIG. 8), regarding the determination of the fiber center $x_c, y_c$ and fiber diameter. First, at block 108, the focused image is retrieved from the memory 44. Block 108 transfers to block 109.

At block 109, parameters and variables are initialized so that the image can be scanned radially outward from the fiber center $x_c, y_c$. The variables are apparent from the discussion hereafter. Block 109 transfers to block 110.

A loop begins at block 110 for successively scanning and analyzing radial lines until it is determined that a radial line has passed over the fiber/plug boundary 66 (FIG. 4). At block 110, a search angle $\theta$ is incremented. In the preferred embodiment, the increment is 1°, but obviously, others could be utilized. Block 110 transfers to block 111.

At block 111, another loop is initiated for ensuring that each pixel on each radial scan line is examined. Block 111 increments the search address on the current radial scan path by one pixel. Block 111 transfers to block 112.

At block 112, a determination is made as to whether the fiber/plug boundary 66 (FIG. 4) has been detected. If not, then block 112 transfers to block 113 for continuing the foregoing search address and search angle loops. If so, then the block 112 transfers to block 115, where the pixel coordinates for the crossover pixel are saved, and then block 115 transfers to block 114 for initiating processing of another radial scan line, if any more exist.

At block 113, a determination is made as to whether the radial line scan is complete. If not, then block 113 transfers to block 111, where the search address on the radial scan path is incremented by another pixel. If so, then block 113 transfers to block 114 for the purpose of retrieving another radial scan path, if any remain.

At block 114, an inquiry is made as to whether the radial scan angle is 360°, i.e., whether radial scan paths have been examined completely around the fiber center $x_c$, $y_c$. If not, then block 114 transfers back to block 110, where the search angle for the radial scan path is again incremented, and the loop process continues. If so, then block 114 transfers to block 116.

At block 116, a circle is mathematically fitted to the collected points. Any suitable mathematical technique can be utilized for fitting the circle to the collected points. Note that in the present situation, the fiber diameter can be expected to fall within a certain range. Hence, the mathematical model utilized to fit the circle can be optimized, if desired, for speed and accuracy with this knowledge. Block 116 transfers to block 117.

At block 117, the points outside the expected radius of the fiber end face 11' are eliminated. Block 117 transfers to block 118.

At block 118, a new circle is fitted to the remaining set of points. The new circle should be a better and more realistic fit than the previously fitted circle. Block 118 transfers to block 119.

At block 119, the diameter of the fiber end face 11' and the location of the fiber center $x_c$, $y_c$ are calculated. This is a straightforward mathematical process based upon the fitted circle. Block 119 transfers to block 120.

At block 120, a set of cross checks is performed and a determination is made as to whether the cross checks yield a passing geometry. In this regard, the fiber diameter must fall within a predefined expected range. Moreover, the location of the fiber center $x_c$, $y_c$ must fall within a particular predefined locus. If it is determined that the dimensional cross checks yield a passing geometry, then block 120 transfers to block 120a, where the fiber diameter and fiber center are saved. If it is determined at block 120 that the dimensional cross checks yield a nonpassing geometry, then block 120 transfers to block 120b, where a message is driven to the output device 48 (FIG. 3) to indicate part failure. After either of blocks 120a or 120b, the subroutine 84 concludes and returns to FIG. 8 for commencement of block 85 therein.

3. Surface Detection And Classification (SDEC) Subroutine

Figure 11:
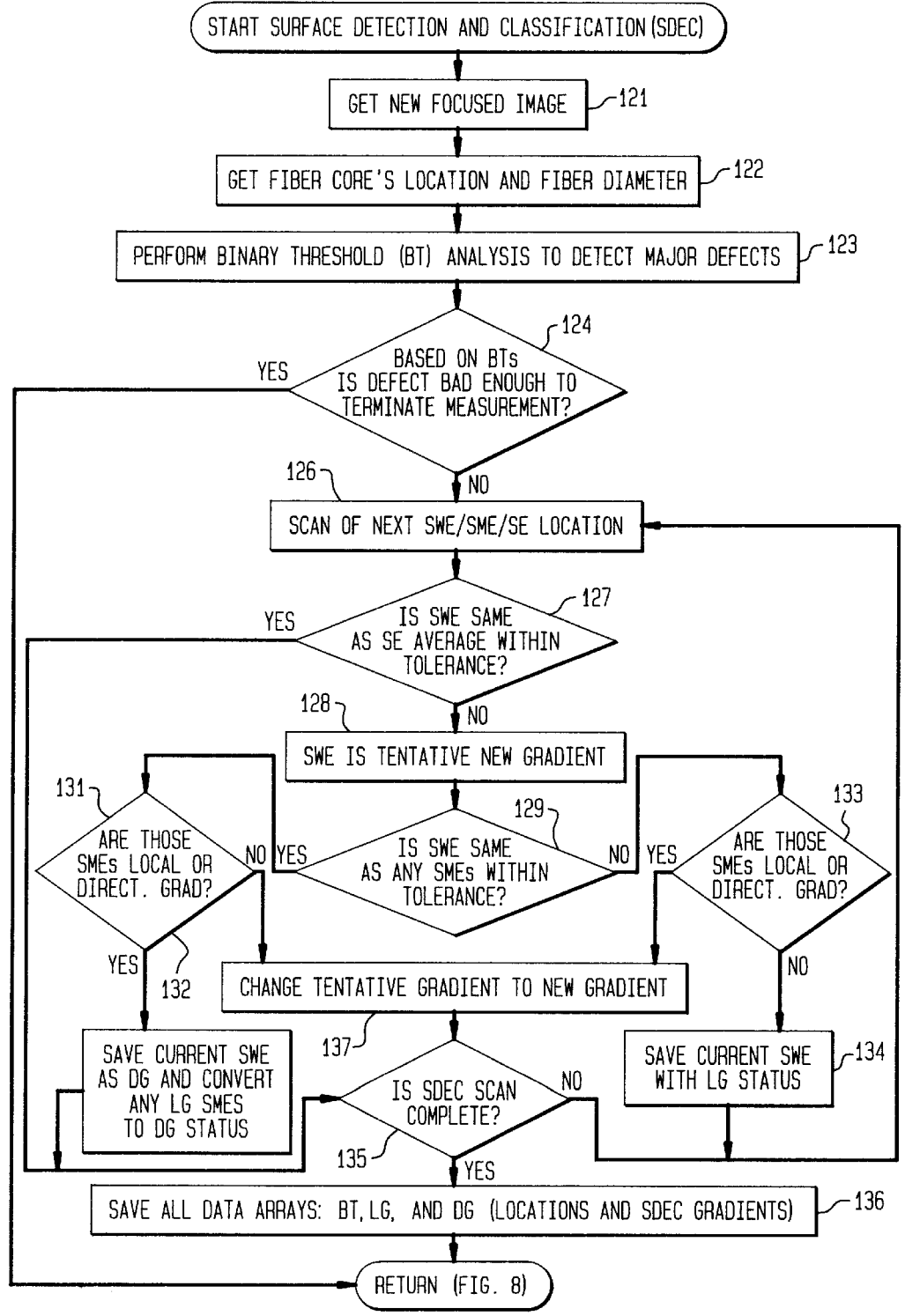
FIG. 11 is a flow chart illustrating a surface detection and classification (SDEC) subroutine of FIG. 8.

FIG. 11 illustrates in detail the single pass scan subroutine that is implemented at block 88 (FIG. 8). When the SDEC subroutine 88 proceeds, the optimally focused image is retrieved from the memory 44 (FIG. 3). This functionality is performed by block 121 in FIG. 11. Block 121 transfers to block 122.

At block 122, the coordinates of the fiber center $x_c,y_c$ and the diameter of the fiber end face 11' are determined using any suitable technique, such as gradient analysis of one or more lines that are drawn across the image. In other words, increases in gradient can be used to identify the line of demarkation between the fiber end face 11' and the surrounding ferrule, or plug. From this information, the location of the fiber center $x_c,y_c$ and the fiber diameter are stored for future use. Block 122 then transfers to block 123.

At block 123, the binary thresholds 16 are discovered. Recall that binary thresholds are generated by severe cracks, chipping, or damage on the surface of the end face 11'. In terms of analysis of pixel values, a binary threshold is a plurality of pixels having intensities that differ by at least a predefined amount from an average of intensities associated with pixels in the image. In this regard, an average of all pixel values within the image disk 65 is determined. Moreover, each pixel value is compared to the average, and if a pixel value is within a predefined tolerance threshold $T_{bt}$, then the pixel value is not considered to be part of a binary threshold. In the alternative, if a pixel value is outside of the predefined tolerance threshold $T_{bt}$ relative to the average, then the pixel value is defined as being part of a binary threshold. Finally, a binary threshold 16 requires more than one pixel value in the preferred embodiment. Accordingly, unless a pixel value that was determined to be part of a binary threshold 16 has a contiguous pixel value that is also part of a binary threshold 16, the pixel value will not be specified as being part of a binary threshold 16. Hence, at the conclusion of block 123, all of the binary thresholds 16, if any, have been located within the image disk 65. Block 123 transfers to block 124.

At block 124, a determination is made as to whether the binary thresholds 16 are bad enough to terminate the measurement. Any suitable analysis may be employed. In the preferred embodiment, the total number of pixels within a binary threshold 16 is compared to the total number of pixels that are not within a binary threshold 16 in order to determine whether the process 88 should proceed. If there are too many binary thresholds 16, then block 124 terminates the SDEC subroutine 88 and the surface analysis program 25. In the alternative, if the binary thresholds 16 pass the test, then block 124 transfers to block 126.

At block 126, a loop is commenced to pass the pixel structure 72 through the image disk in order to identify local and directional gradients 17, 18. At block 126, an SWE, SME1–SME4, and SE1–SE3 are retrieved from the image disk. In the case where this is the first pixel to be sampled, the SWE is identified at the top left corner of the image disk, accepting the first two pixels from the mask 62 (FIG. 4). Block 126 transfers to block 127.

At block 127, a determination is made as to whether the SWE is the same as the SE average within a tolerance, i.e., a determination is made as to whether equation (1) is true or not. If so, then the SWE is not a local gradient 17, and block 127 transfers to block 135. A new pixel structure 72 is obtained and analyzed, if any remain at this point. If, however, the SWE is not the same as the SE average within a tolerance, i.e., the equation (1) is not true, then it is concluded that the SWE is a tentative local gradient 17 by block 128. Block 128 transfers to block 129.

At block 129, an inquiry is made as to whether the SWE is the same as any SMEs within a tolerance, i.e., a determination is made as to whether any of the equations (2)–(5) are true or false. If so, then the current SWE may be part of a directional gradient 18 or a nongradient, and block 129 transfers to block 131.

At block 131, an inquiry is made to determine if any of the SMEs that were matched to the SWE are local or directional gradients 17, 18. If the SMEs are nongradients, then block 131 transfers to block 137, which reclassifies the tentative gradient as a nongradient. However, if it determined at block 131 that one or more of the SMEs are a gradient, then block 131 transfers to block 132, where the current SWE is saved as being part of a directional gradient. If any SME that yielded this result is classified as a local gradient, then it is reclassified as a directional gradient 18. Blocks 132 and 137 both transfer to block 135.

In the alternative, when it is determined at block 129 that the SWE is not the same as any SMEs within a tolerance, then block 129 transfers to block 133. At block 133, a determination is made as to whether those SMEs that resulted in an untrue equation (2)–(5) are local or directional gradients. If so, then block 133 transfers to block 137, which classifies the SWE as a nongradient. If not, then block 133 transfers to block 134, where the current SWE is saved as a local gradient. Moreover, blocks 134 and 137 both transfer to block 135.

After the pixel structure 72 has passed through the image disk one time, block 135 transfers to block 136. At block 136, the locations of the binary thresholds 16, local gradients, and directional gradients are stored in the memory 44 (FIG. 3) by the SDEC subroutine 88, and the SDEC subroutine 88 returns to block 89 (FIG. 8).

It will be obvious to those skilled in the art that many modifications and variations may be made to the embodiments as described without substantially departing from the spirit and scope of the present invention. It is intended that all such modifications and variations be included herein within the scope of the present invention, as is set forth in the appended claims. Furthermore, in the claims hereafter, all means-plus-function clauses are intended to include any structures or materials for performing or accomplishing the recited function.

Wherefore, the following is claimed:

1. A method for analyzing a surface of an optical fiber end face, comprising the steps of:

(a) producing a digitized image of said optical fiber end face, said image having a plurality of pixels;

(b) searching for discontinuities in said image by successively analyzing a plurality of contiguous pixels, said analysis at each said pixel including examining a pixel structure corresponding with each said pixel to determine whether a discontinuity resides at each said pixel, said pixel structure including a plurality of pixels that were previously analyzed:

(c) analyzing structure memory elements that are contiguous and that are situated contiguous with a pixel that is currently analyzed, and referred to hereafter as a structure working element;

(d) analyzing satellite elements that are contiguous with at least one of said memory elements and that are noncontiguous with respect to said structure working element;

(e) determining whether said structure working element is a local gradient and a directional gradient based upon said analyses of said satellite elements and said structure memory elements, wherein:

said local gradient is a pixel having an intensity that differs by at least a first predefined amount from intensities associated with surrounding pixels, wherein said local gradient corresponds with a surface texture discontinuity said directional gradient is a plurality of pixels having intensities that differ by at least a second predefined amount from intensities associated with pixels situated about said directional gradient, wherein said directional gradient corresponds with a scratch;

(f) combining intensities of said satellite elements to derive a satellite element average;

(g) comparing said satellite element average to said structure working element;

(h) when said average is unequivent to said structure working element within a first predefined threshold, then identifying said structure working element as a tentative gradient and performing the following steps:

(1) comparing each said structure memory element to said structure working element;

(2) when said structure memory element is equivalent to said structure working element as defined by a second predefined threshold, then identifying said structure working element as a directional gradient and identifying said structure memory element as a directional gradient if not already identified as such;

(3) when said structure memory element is unequivalent to said structure working element as defined by said second predefined threshold, then identifying said tentative local gradient as a local gradient; and (i) when said average is equivalent to said structure working element as defined by said first predefined threshold, then identifying said structure working element as a nongradient.

2. The method of claim 1, further comprising the step of scanning said pixels of said image with said pixel structure in a raster format.

3. The method of claim 1, further comprising the step of analyzing each said pixel only a single time during said searching step.

4. The method of claim 1, further comprising the step of searching for any binary thresholds in said image, said binary threshold being a plurality of pixels having intensities that differ by at least a third predefined amount from intensities associated with an average of pixel intensities in said image.

* * * * *